United States Patent [19]

Ferguson

[11] Patent Number: 6,029,247
[45] Date of Patent: Feb. 22, 2000

[54] METHOD AND APPARATUS FOR TRANSMITTING SECURED DATA

[75] Inventor: Daniel T. Ferguson, Orem, Utah

[73] Assignee: Novell, Inc., Orem, Utah

[21] Appl. No.: 08/762,561

[22] Filed: Dec. 9, 1996

[51] Int. Cl.[7] .................................................. G06F 12/14
[52] U.S. Cl. .............................. 713/201; 713/202; 380/3; 380/4
[58] Field of Search ...................... 395/187.01; 714/201, 714/202; 380/3, 4

[56] References Cited

U.S. PATENT DOCUMENTS 5,608,903   3/1997   Prasad et al. ............................ 395/610

OTHER PUBLICATIONS

Novell, Inc., NetWare System Interface Technical Overview, Chapter 3 (pp. 45–70), 1990.
International Telecommunication Union, "ITU–T X.500 Recommendation: Data Networks and Open System Communications: Directory; Information Technology—Open systems Interconnection—The Directory: Overview of Concepts, Models, and Services", Nov. 1993.
Novell's Guide to NetWare 4.1 Networks, table of contents and Chapters 12–13, Hughes and Thomas, ISBN: 1–56884–736–X, 1996.

*Primary Examiner*—Robert W. Beausoliel, Jr.
*Assistant Examiner*—Brian H. Shaw
*Attorney, Agent, or Firm*—Dinsmore & Shohl LLP

[57] ABSTRACT

A system for transmitting secured data is disclosed. A plurality of interconnected nodes access a distributed directory having a plurality of objects and attributes. An access control mechanism controls access to the distributed directory. An encryption system and a decryption system are used to encrypt and decrypt secret data. The resulting encrypted data is associated with an attribute of an object, whereby access to the secret data is permitted if (i) the access control mechanism permits access to the attribute, and (ii) decryption information is presented to the decryption system to decrypt the secret data.

29 Claims, 6 Drawing Sheets

Security Categories

Symmetric Systems

Asymmetric Systems

METHOD AND APPARATUS FOR TRANSMITTING SECURED DATA

TECHNICAL FIELD

The present invention relates generally to the transmission of secured data, and will be specifically disclosed in connection with the transmission of secured data over a distributed directory.

BACKGROUND OF THE INVENTION

The virtual explosion of technological advances in microelectronics, digital computers, and software have changed the face of modern society. In fact, these technological advances become so important and pervasive that some people refer to this explosion as the "Information Revolution." Through telephone lines, networks, satellite communications and the like, information is routinely generated, transmitted, received and processed. Beyond the large scale communication systems, information is being communicated in much smaller and abstract ways, such as packets in computer networks, instructions within individual computers, or even the individual pulses within a digital wrist watch. Often, the information being transmitted is highly sensitive, such as passwords, financial transactions, and the like. When measured against the ever increasing ability and creativity of saboteurs, hackers and agents attempting to access the sensitive information, it is critical that such information have a reliable and secure means to be sent so as to prevent unauthorized access to such information. The present invention, as disclosed in detail below, describes a novel method and apparatus for transmitting secured data, which provides improved reliability of transmission and improved security to preserve the confidentiality of secret data.

SUMMARY OF THE INVENTION

Accordingly, an object of the invention is to improve the reliability of the transmission of secret data.

A further object of the invention is to provide an improved means for preventing unauthorized access to secret data.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

To achieve the foregoing objectives, a system is provided comprising a plurality of interconnecting nodes, such as computers interconnected on a network. A distributed directory, having a plurality of objects with each object having one or more associated attributes, is accessed by the plurality of nodes. An encryption system is operative to encrypt data, and a decryption system is operative to decrypt data that has been encrypted by the encryption system. The system also comprises an access control mechanism operative to control access to the distributed directory. Encrypted data is encrypted from secret data (such as password or a confidential document) using the encryption system. The encrypted data is associated with an attribute of an object in the distributed directory, whereby the encrypted data is accessible to at least one of the nodes, and access to the secret data is permitted if (i) the access control mechanism permits the encrypted data associated with the attribute to be obtained, and (ii) decryption information (e.g. a private key) is presented for the decryption system to decrypt the encrypted data.

Another aspect of the invention is a method in a computer system for transmitting and receiving secured information. Secret data is encrypted to create encrypted data. Next, the encrypted data is associated with an attribute of an object in a distributed directory. The encrypted data is then transmitted as a value of the attribute across the distributed directory. Next, the attribute of the object is accessed and the encrypted data is retrieved. The encrypted data is then decrypted such that the secret data can then be retrieved.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Often computers telecommunicate between each other and share information, applications and/or services. Sometimes in this setting, the various computers are referred to as nodes, which is a generic term referring to a point in a interconnected system. One type of computer network employs a client/server architecture, wherein the portions of network applications that interact with human users are typically separated from the portions of network applications that process requests and information. Often, the portions of an application that interact with users or access network resources are called client applications or client software, and the portions of an application that process requests and information are called server applications or server software. Client machines tend to run client software and server machines tend to run server software, however a server can be a client as well.

Figure 1:
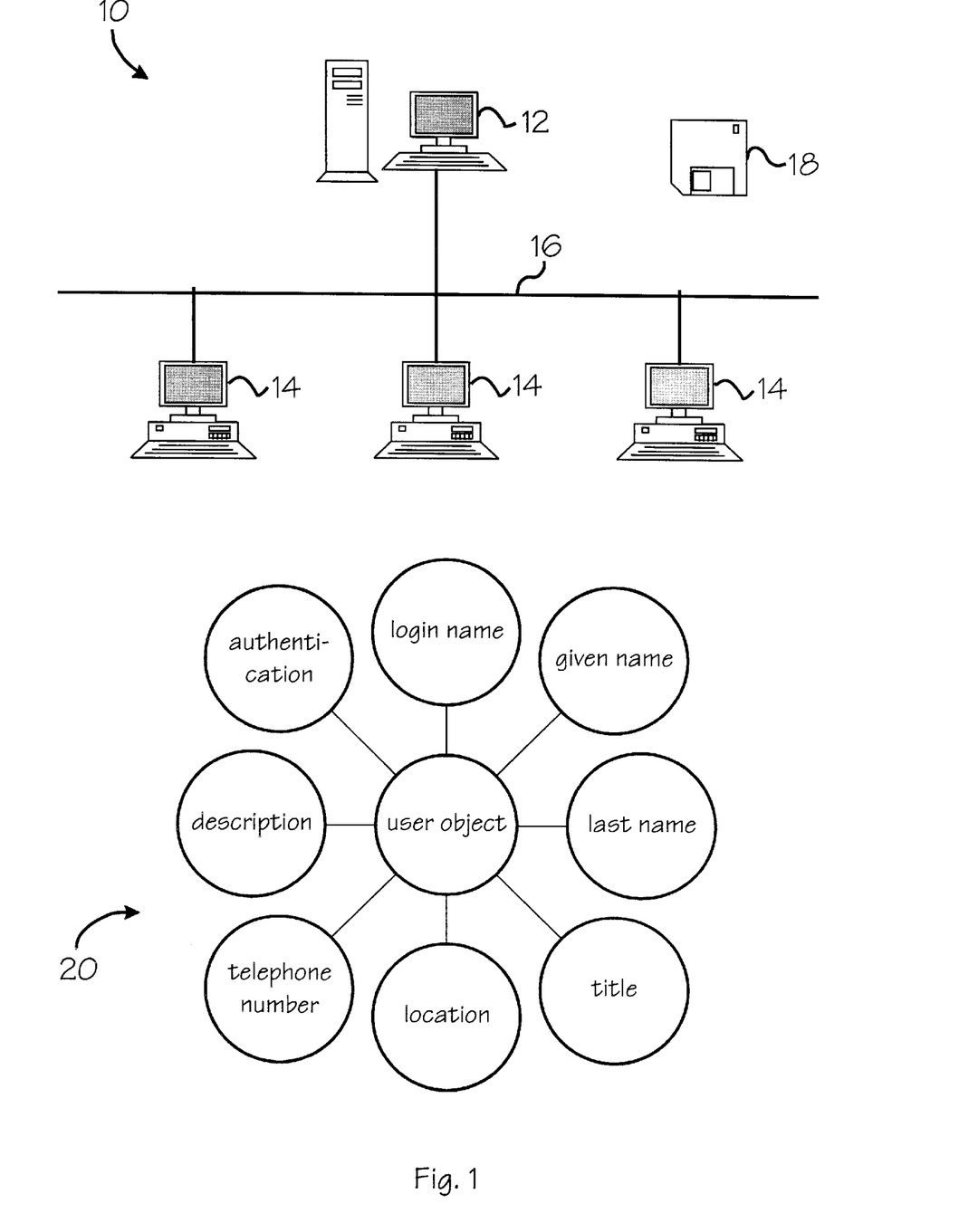
FIG. 1 depicts an example of interconnected nodes, a computer readable medium, and an object with several associated attributes.

FIG. 1 illustrates a sample client/server network 10. As one with ordinary skill in the art will readily appreciate, a client/server network is only one type of network, and a variety of other configurations, such as peer-to-peer connections, are also considered computer networks. In a client/server network, a plurality of nodes are interconnected such that the various nodes send and/or receive information to/from one another. As shown here, a server node 12 is interconnected to a plurality of client nodes 14 using a connection 16 such as a token ring, ethernet, telephone modem connection, radio or microwave connection, or the like.

A computer readable medium 18, shown here as a floppy diskette, holds information readable by a computer, such as programs, data, files, etc. For the purposes of the specification and claims, a "program" is a process or task capable of being run or executed on a processor. Examples of programs include executable files, NetWare loadable modules ("NLM"), dynamic link libraries ("DLL"), batch files, threads, and the like. As one with ordinary skill in the art will readily appreciate, computer readable medium can take a variety of forms, including magnetic storage (such as hard disk drives, floppy diskettes, etc.), optical storage (such as laser discs, compact discs, etc.), electronic storage (such as random access memory "RAM", read only memory "ROM", etc.), and the like.

The Distributed Directory

One mechanism to maintain and access information across a network of interconnected nodes is a distributed directory, such as Novell Directory Services ("NDS"), which is based on the X.500 network services protocol developed and published by the CCIT and Open Systems Interconnection Consortium. Usually in the context of a client/server network, a distributed directory spans and is shared by multiple networking server nodes, although a single server node can also maintain a distributed directory. While distributed directories are often used with client/server networks, they are not necessarily limited to the context of such networks. Information on the distributed directory can be created, read, modified, and shared by other nodes, such as client nodes or other server nodes, who have applicable access rights to the distributed directory.

In NDS, the structure of the distributed directory is governed by a set of rules called the schema. The schema defines the rules for adding and managing objects and attributes of objects in the distributed directory. These rules are specified through a data dictionary that provides a standard set of data types from which objects can be created. Each object in the distributed directory belongs to an object class that specifies what attributes can be associated with the object. All attributes are based on a set of standard attribute types, which in turn are based on standard attribute syntaxes. The schema controls not only the structure of the individual objects, but also the relationship among the objects in the distributed directory. In controlling this relationship, the schema specifies subordination among object classes. That is, for every object there is a group of object classes from which subordinate objects can be formed. Objects that can contain other objects are called container objects, which are the building blocks of the distributed directory. Objects that cannot contain other objects are known as non-container or leaf objects.

Figure 2:
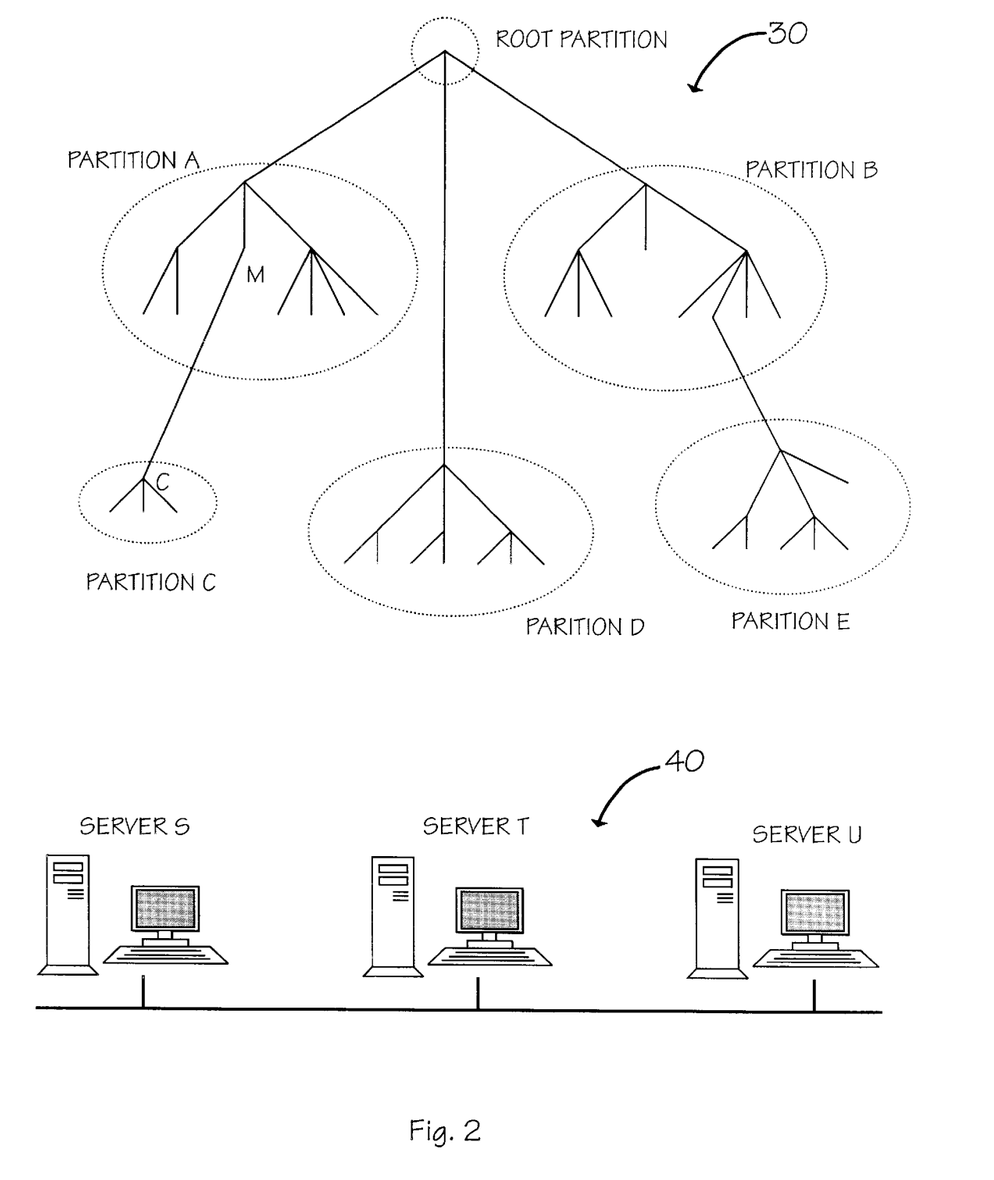
FIG. 2 depicts an example of a distributed directory and several servers accessing the distributed directory.

As shown in FIG. 2, the objects within the sample distributed directory 30 are viewed by a user in a hierarchial structure, generally in the form of a tree, where the branching points and leaves represent the objects. The distributed directory 30 is additionally organized in partitions, as illustrated by the dashed ellipses, with each partition comprising a plurality of objects organized as a logical subtree. Partitions closer to the root of the distributed directory 30 are called parent partitions to those farther from the root, which are called child partitions. Each partition takes the name of the entry that is the root of the subtree. For instance, the root object of Partition C is the object C.

Multiple replicas of the partitions are stored across the network 40, wherein each insular server node holds a unique set of partitions and therefore a unique set of objects within that insular node. For instance, the following table demonstrates a sample partition organization:

|  | Root | Partition A | Partition B | Partition C | Partition D | Partition E |
| --- | --- | --- | --- | --- | --- | --- |
| Server S | Master | — | Master | Master | Read Only | Master |
| Server T | Read Only | Master | Secondary | — | Master | — |
| Server U | — | Read Only | Secondary | — | Read Only | Secondary |

The distributed directory contains a collection of objects, sometimes referred to as identities, with associated attributes or properties. For example, the object 20 is a user object that represents a human user. The object 20 has a variety of associated attributes, such as "Given Name", "Last Name", "Title", etc. Each associated attribute has a value, however, sometimes values are not associated with an attribute. For example, the value for the property "Given Name" might be "George". Beyond representing users, objects in the distributed directory represent things that humans relate to when dealing with computers. For instance, some typical objects might represent printers, print queues, files, resources, computers, and the like. In addition, objects can represent non-computer related things such as countries, companies, organizations, departments, buildings, and the like. Furthermore, objects can be organizational in nature to group other objects together. As one with ordinary skill in the art will readily appreciate, objects can represent virtually anything, whether imaginary or real, and are not limited to the context of a distributed directory.

As suggested by this table, there are three basic kinds of replicas. With a Read Only replica, clients can read entries from this replica, but cannot change entries. Each partition can have zero or more Read Only replicas. With a Secondary replica, clients can read, write, create and destroy entries in the distributed directory by accessing this replica. Each partition has zero or more Secondary replicas. A Master replica acts like a Secondary replica, but clients can additionally make structural changes by accessing the master replica, such as splitting and combining partitions, or creating and removing replicas. Each partition has exactly one Master replica.

In addition to the three types of replicas illustrated in the table, a fourth kind of partition called subordinate references are also used to coordinate partitions between a plurality of nodes. A subordinate reference does not store a replica of its partition data. Rather, it is a skeleton: it stores only attributes to the partitions root most object. Whenever a server holds a complete replica (i.e. Master, Secondary or Read Only) of a partition, but not a directly subordinate partition, it keeps a subordinate reference of the subordinate partition. Referring to FIG. 2 and the table, Server T holds a subordinate reference for Partition C (since it keeps a replica of Partition A) and Partition E (since it keeps a replica of Partition B). Server T ends up with a replica of each partition when subordinate references are included. Likewise, Server U holds a subordinate reference for Partition C (since it keeps a replica of Partition A). But Server U does not hold a replica of each partition: the Root Partition is absent. With subordinate references, a server can walk up and down the name tree across partition boundaries.

The distributed directory is a loosely synchronized database. An update made at one replica does not appear instantaneously at the other replicas. As such, it is possible that when an attribute value has been updated recently, a client could get a different result when reading attributes from different servers. A replication system is used to replicate or synchronize different objects changes in the distribute directory throughout the other servers accessing the distributed directory. One way of achieving this replication or synchronization is using the partition as a unit of data replication. An update made at one replica propagates to other replicas over time. Once the update ceases, the replicas converge to identical values. The server keeps a time stamp for each value of each attribute of each entry, identifying when and where that value was last modified. Since there can be competing updates at different replicas, the time stamps are used to determine which update is later. Doing so ensures that whenever multiple servers receive competing updates, each server with get the same result.

When a change is made locally to an entry in the distributed directory, a process in the server wakes up to propagate the change to all the replicas of the partition. Preferably, there is a brief time delay to allow a cluster of updates to be propagated in one session. This propagation proceeds one replica at a time through the replica list of a partition. After a server successfully sends all pending updates to one replica (or if the operation fails), it goes on to the next replica until all replicas have been updated. Replicas not updated in one round of the synchronization process are rescheduled for a later synchronization cycle. Also, obituaries keep track of information pending transmission to other servers. Obituaries are attribute values not visible to clients, but are used in server-server exchanges. Since obituaries are attribute values, they are synchronized using the same mechanism as the updates and are replicated across the distributed directory. The replication system of a distributed directory provides a highly reliable mechanism to transmit data between interconnected nodes.

Security

Figure 3:
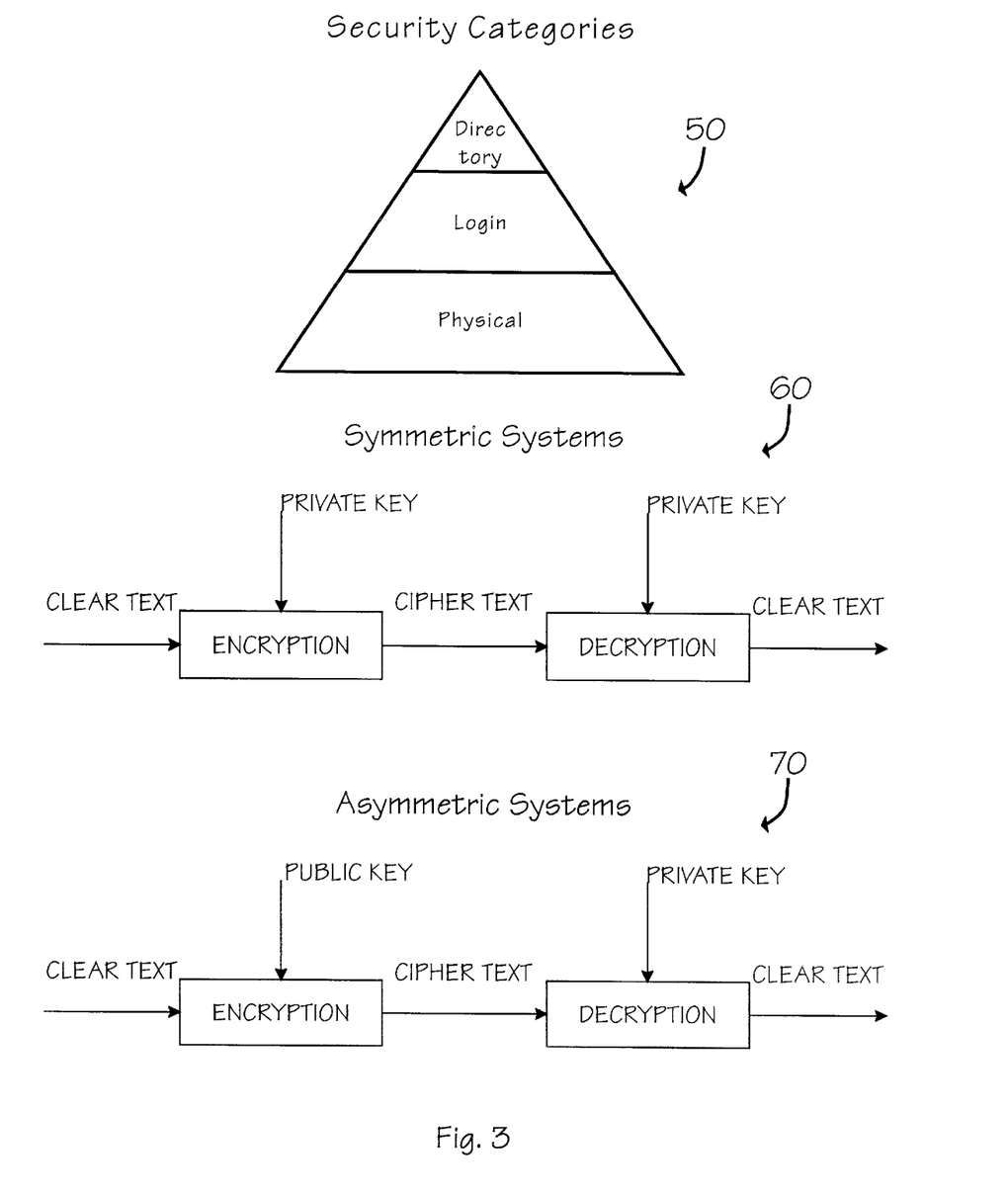
FIG. 3 depicts an access control mechanism and two examples of encryption and decryption systems.

Access to network resources and objects in the distributed directory can be regulated to preserve security. This is particularly desirable as networks become larger and hold more important information. The access control mechanism 50 represented in FIG. 3 illustrates three examples of directory security: physical security, login security, and directory security. Each of these examples of security regulate access to a network and its resources, and can be used independently or in conjunction with one another, or with other forms of security. As the name implies, physical security refers to limiting physical access to a given network resource. For instance, servers in a client/server network are often maintained in a locked room with limited access. As a further example of physical security, a file server console or a workstation can be locked requiring a password or key to access or utilize the server or workstation, respectively.

Login security can vary greatly from one computer system to the next. One form of login security comprises a login phase and an authentication phase. The login phase typically involves prompting a source (such as a user, a program, a resource, etc.) which is attempting to enter the system for a name and a password. After successfully proving knowledge of the password, the source receives an encrypted private key from a server. Next, a credential is used in conjunction with the private key to generate a signature. In the authentication phase, the public key of the server is read by the source. The signature and credential generated during the login phase is used to create a proof which is sent to the server. The proof is verified by the server through a computation using the source's public key stored in the source's object. If the proof is correct, then authentication is successful and the source is allowed access to the system. After successfully completing the authentication phase, the source has "logged in" the system and is represented by an object identity on the distributed directory. The login phase is typically performed only once. However, if, for example, a connection needs to be made to other network servers, the authentication phase can be repeated through a process known as background authentication. This involves subsequent verification by servers using the proof and the public key without additional intervention by the source.

Directory security is usually used in conjunction with login security, where directory security is not used unless login security has been first verified. While directory security can vary greatly, it generally comprises two parts: file system security and object security. File system security provides access control to files and directories, and basically involves assigning trustee rights and file/directory attributes. Trustee rights assignments can be granted to any object in the distributed directory including container objects, user objects, group objects, and organization roles. Examples of such rights include access control, supervisor, read, Arite, create, erase, modify, and file scan. In contrast, file/directory attributes control what actions can or cannot be taken on a file or directory. For example, certain files could be flagged as "read only" and "shareable" to prevent any unintentional or intentional deletions of such files or directories.

On the other hand, object security provides access control to directory objects and associated operations. Object security generally includes object rights, property rights, and access control lists ("ACL's"). Object rights are granted to a particular object to access or manage another object. Examples of such rights include supervisor, browse, create, delete, and rename. In contrast, property rights enable a trustee to view or change the values of a particular object's properties. A trustee could have rights to certain properties or to all properties of a particular object. For example, the supervisor property right over an object grants supervisor privileges for all properties in that object. All other rights assignments made at the object level, however, are not affected by the property rights. In fact, supervisor rights at the property level do not grant supervisor rights at the object level. Only the reverse is true. The ACL is a special property of every object, which contains trustee assignments for an object and its properties. Typically, an ACL is a tabulated property containing three entries: the trustee ID, the type of access (i.e. Object or property), and the actual rights assignment. A user object, for example, with the write right to the ACL of another user object has what is known as "managed rights" over the user object. This means that an object with the write right of an object ACL can make any rights assignments to that object.

FIG. 3 also illustrates two examples of encryption and decryption systems 60, 70. Generally, such systems scramble clear text (e.g. a textual message, a document, a program, a secret code, etc.) Into cipher text which is unusable, unrecognizable, and is very difficult to transform back into the original clear text without the use of a secret key. The secret key is analogous to a physical key that is used to lock a pad lock: to decrypt the cipher text, the corresponding secret key must be used. Symmetric systems 60 are the most common type of systems. They are known as symmetric because the same private key is used for both encryption and decryption. Clear text and a private key are entered into an encryption system, which transforms the clear text into cipher text. If the same private key is introduced with the cipher text to a decryption system, the identical clear text will result. Typically, the symmetric keys are changed often to preserve security. Some of the more common symmetric systems are RAC2, RAC4, and the Data Encryption Standard ("DES").

The asymmetric system 70 uses two different keys: a public key and a private key. The private key is kept private by the owner of the private/public key pair and the public key is typically distributed or published to anyone who requests it (often by means of a certificate). The public key is used to encrypt clear text into cipher text, and the private key is used to decrypt the cipher text back into clear text. The asymmetric systems tend to be significantly slower than the symmetric systems. One of the most common asymmetric systems is the RSA Public-Key Cipher.

Examples

One embodiment of the present invention comprises a system having a plurality of interconnected nodes accessing a distributed directory, such as the distributed directory 30. For instance, the nodes can be computers interconnected on a network, such as the client/server network 10. The system includes an encryption system and a decryption system, which is preferably similar to the asymmetric system 70 that uses a private/public key pair. The access control mechanism 50, which can include physical, login and/or directory security, controls access to the distributed directory. Encrypted data is encrypted from secret data using the encryption system. Generally, secret data refers to any information which is desired to remain confidential, such as passwords, confidential documents, proprietary programs, financial data, and the like. The secret data is associated with an attribute of an object in the distributed directory. For instance, the object can be the user object 20 and the secret data could be the user's password which is entered as a value for the "Authentication" attribute. Being associated with the attribute, the encrypted data is accessible to at least one of the nodes, preferably due to a replication system transmitting updates of the object based on a partition organization. In this embodiment, access to the secret data is permitted if the access control mechanism 50 permits the encrypted data associated with the attribute to be obtained, and the appropriate decryption information (e.g. a private key) is presented for the decryption system to decrypt the encrypted data. In this example, the system provides the reliability of transmission associated with a distributed directory with the dual levels of security found in the access control mechanism and the encryption system.

Figure 4:
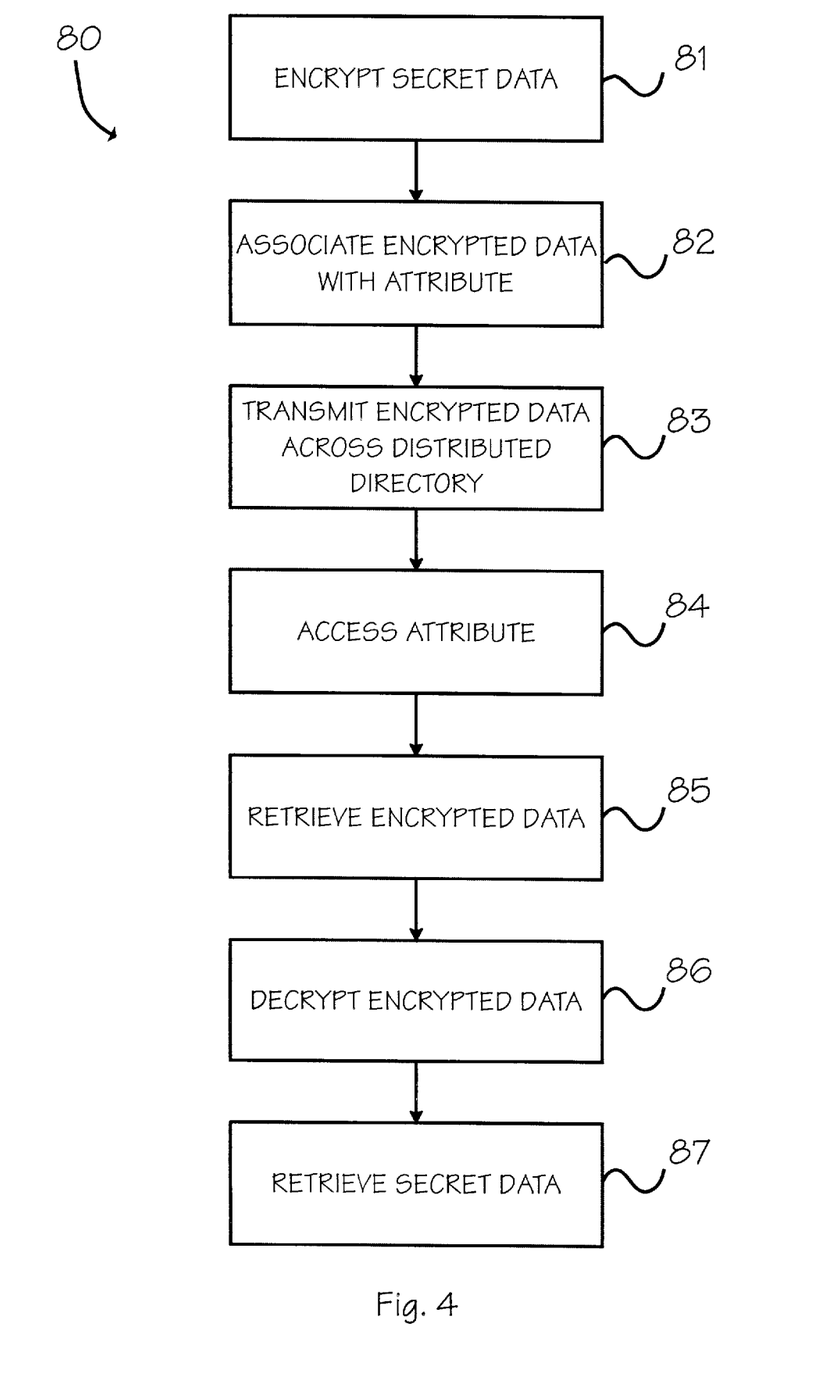
FIG. 4 depicts a flow chart demonstrating one aspect of the invention.

FIG. 4 depicts a process 80 illustrating an aspect of the present invention. This process 80 can be embodied as a series of steps or as a program on a computer readable medium. At step 81, secret data (as described above) is encrypted to create encrypted data. Preferably, the secret data is entered as clear text with a public key to an encryption system, wherein the encrypted data is the resulting cipher text. The next step 82 involves associating the encrypted data with an attribute of an object in a distributed directory. For instance, an encrypted password can be written as a value for the property "Authentication" in the user object 20. Proceeding to step 83, the encrypted data is transmitted as a value of the attribute across the distributed directory. Preferably, this transmission step is achieved by a replication system in the distributed directory. At step 84, the attribute is accessed, which is preferably enforced by one or more categories of security in the distributed directory. In steps 85 and 86, the encrypted data is retrieved and decrypted. Preferably, the encrypted data is entered as cipher text with a private key to a decryption system, which will return the secret data as clear text. Next, at step 87 the secret data is retrieved and is ready for use. In the context of NDS, the access and retrieve steps are preferably achieved through the NDS operations Resolve Name, Read, and Modify Entry. These operations take the form of NetWare Core Protocol packet requests, which are well known to one with ordinary skill in the art.

Using this process 80, secured information can be transmitted and received while preventing unauthorized access to the secured information. For instance, a manager having completed performance reviews could use the process 80 to securely deliver the reviews to a vice-president. Using the public key of the vice-president, the manager can associate the encrypted performance review with an attribute of the manager's user object, the vice-president's user object, or any other object. As the distributed directory will transmit the updated object through the distributed directory, the vice-president will have access to the encrypted performance review. Such a transmission could be achieved whenever the manager and vice-president both access the distributed directory, whether it be within the same building or in different cities. Using the private key, the vice-president could decrypt the review into clear text and use it appropriately. While associated with the attribute, however, employees who had been the subjects of the performance review are prevented from obtaining a clear text version of the review because is encrypted. Moreover, a second level of protection is achieved if the access control mechanism prevents the employees from accessing the attribute to which the encrypted performance review is associated.

Figure 5:
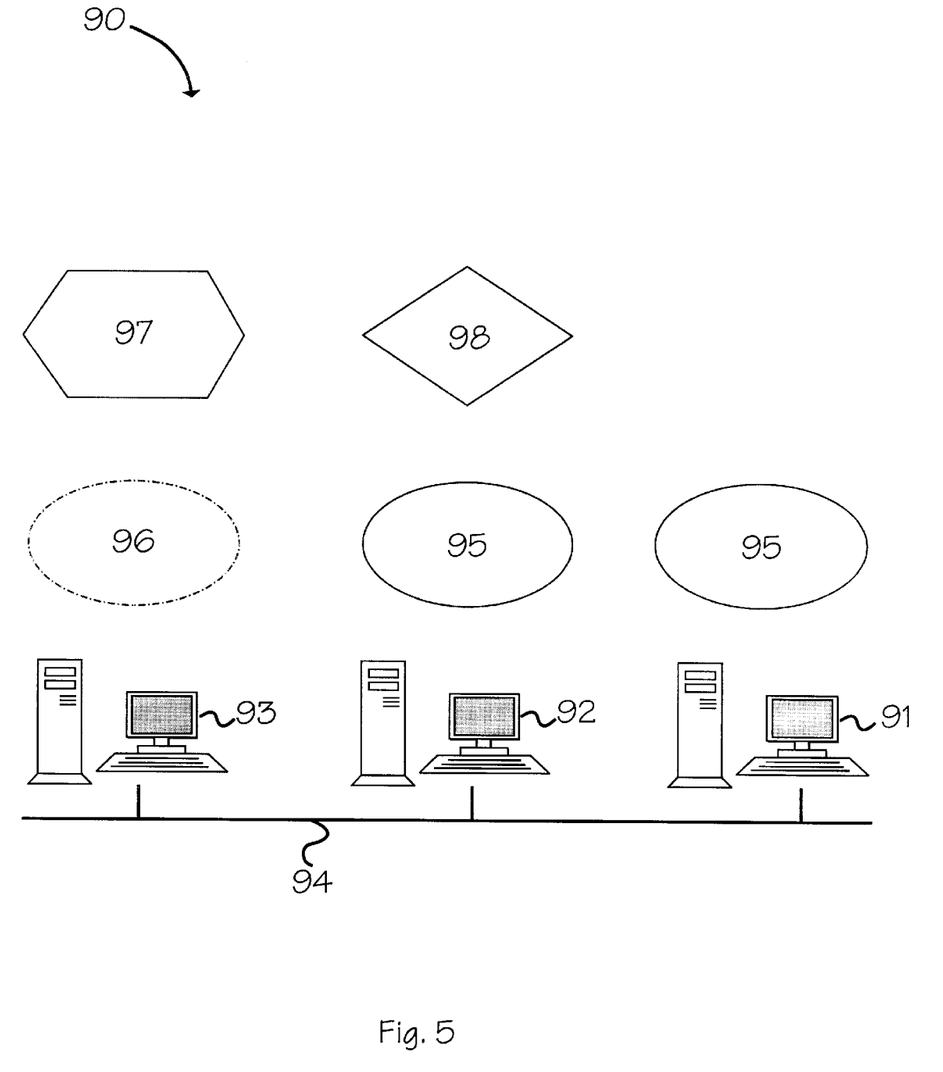
FIG. 5 depicts a system embodying the present invention.

Another example of the invention is illustrated in FIG. 5. A plurality of server nodes 91, 92, 93 are interconnected through the connection 94. The domestic servers 91, 92 are each operating a domestic system 95. The foreign server 93, however, is operating a foreign service 96 which is different than the domestic service 95. For instance, if the domestic service 95 is NetWare, examples of foreign services include as Windows NTH, Windows 95, Unix, SO/2, etc. In this structure, it is desirable that the domestic servers 91, 92 and the foreign server 93, along with the services provided by the servers 91, 92, 93, all be represented and administered on the same distributed directory. Preferably, the domestic systems 95 maintains the distributed directory.

A listening service 97 loaded on the foreign server 93 is written for the native platform of the foreign system 96. The listening service 97 listens for commands in the form of notifications and carries out the actions in the foreign system's 96 native protocols. An event monitor 98 is loaded on the domestic server 92. The event monitor 98 forwards notifications of events relevant to the listening service 97, which in turn will respond to the notification by collecting any data that may be necessary to perform the necessary actions on the foreign server 93. Effectively, the listening service 97 acts as a liaison between the foreign system 96 and the distributed directory native to the domestic system 95. However, because the foreign system 96 has different protocols than the domestic system 95, password information for a particular object will vary between the two systems 95, 96. As such, a separate set of passwords must be remembered to use the services and information on the foreign system 96.

Figure 6:
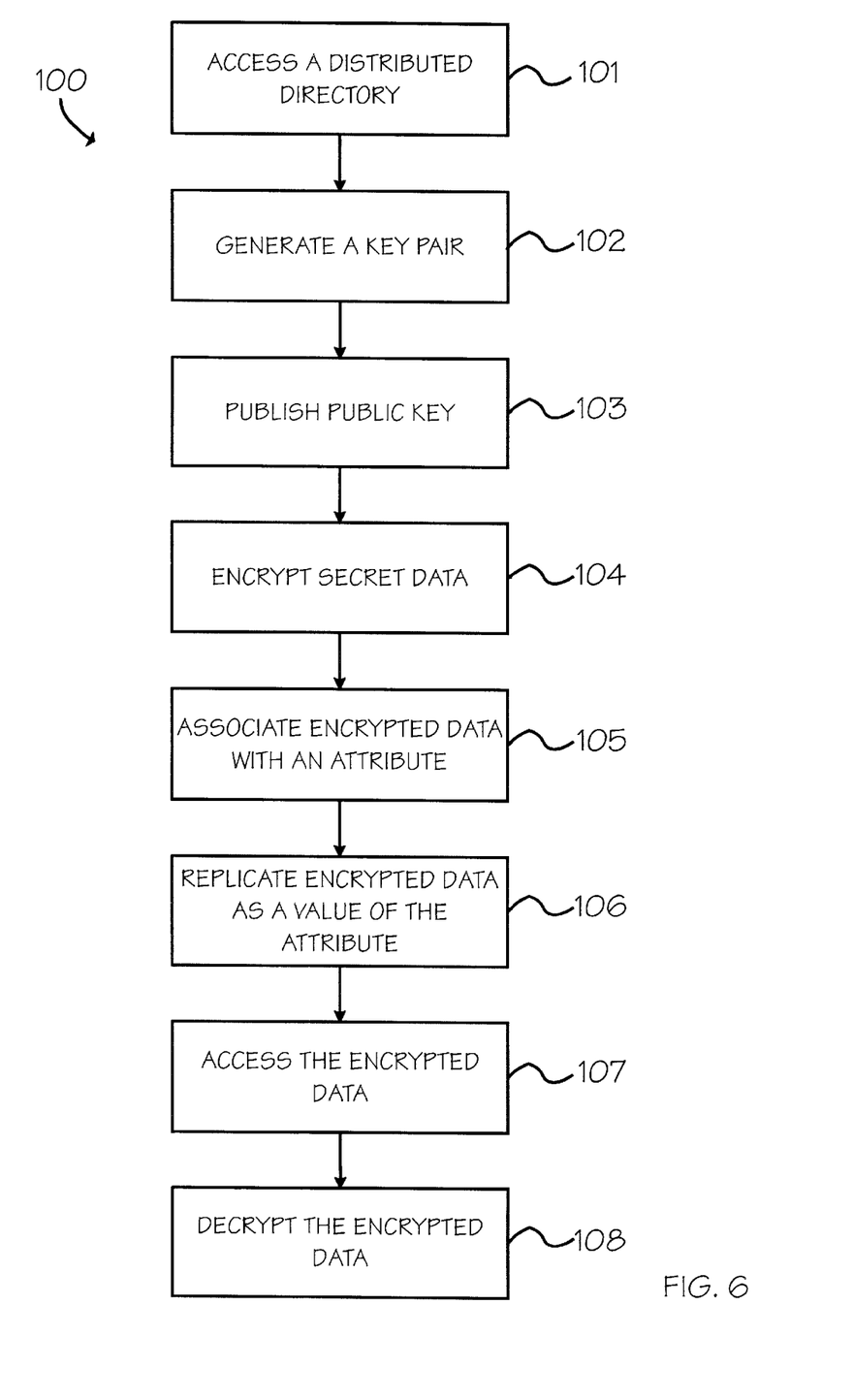
FIG. 6 depicts a flow chart illustrating an aspect of the present invention.

Using the present invention, password information for an object can be securely synchronized between the two systems 95, 96. As depicted in FIG. 6, which shows a process that preferably takes the form of a program in a computer readable medium, the first step 101 involves the foreign server accessing the distributed directory. In this example, this is achieved through the listening service 97 and the event monitor 98. Next, step 102 involves the foreign server 93 generating a private/public key pair. This can be achieved by the listening service 97, by the foreign system 96 upon being prompted by the listening service 97, or by other appropriate means. It is preferred that the foreign server 93 generates the key pair to avoid the transmission of the private key. At step 103, the public key is published. This can be achieved in a number of ways, including associating the public key as an attribute of the foreign server's 93 object on the distributed directory, e-mailing the public key to a recipient, hand delivering the public key to a person, etc.

Continuing to step 104, secret data in the form of a password is generated and encrypted using the public key. Generation can involve automatically providing the password from an object in the domestic system 95 to the encryption system, manually entering the password, calculating a value, or other suitable data generating method, The resulting encrypted data is then associated with an attribute of an object. For instance the encrypted password can be entered as a value for the "Authentication" attribute of the user object 20 to which the password applies. As the changed value for the attribute is replicated through the distributed directory in step 106, the event triggers the event monitor 98 which will in turn trigger the listening service 97. In steps 107, the listening service 97 accesses and decrypts the encrypted data using the private key. Then, the listening service 97 makes the appropriate native function calls in the foreign system 96 to associate the secret data with a corresponding object in the foreign system 96.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For instance, the invention has been illustrated in the context of network ed computers, however, the invention can be used with any interconnect nodes. Likewise, the invention has utility in systems other than NDS and NetWare, including, for example, Windows NT, Windows 95, SO/2, Macintosh, Vines, Unix, etc. Accordingly, this invention is intended to embrace all such alternatives, modifications, and variations that fall within the spirit and broad scope of the impended claims.

What is claimed is:

1. A system, comprising:
    (a) a plurality of interconnected nodes;
    (b) a distributed directory being accessed by the plurality of nodes;
    (c) a plurality of objects in the distributed directory, each object having one or more associated attributes;
    (d) an encryption system operative to encrypt data;
    (e) a decryption system operative to decrypt data that has been encrypted by the encryption system,
    (f) an access control mechanism operative to control access to the distributed directory;
    (g) encrypted data encrypted from secret data using the encryption system, said encrypted data being associated with an attribute of an object in the distributed directory, whereby the attribute is accessible to at least one of the nodes and access to the secret data is permitted if:
        i. The access control mechanism permits the encrypted data associated with the attribute to be obtained, and
        ii. Decryption information is presented for the decryption system to decrypt the encrypted data; and
    (h) a replication system operative to replicate objects and attributes in the distributed directory from one node to at least one other node and thereby transmit the encrypted data from one node to at last one other node.

2. A system as recited in claim 1, wherein the nodes are computers interconnected on a network.

3. A system as recited in claim 2, wherein the network is a client/server network.

4. A system as recited in claim 3, wherein at least one server in the client/server network is operating a foreign system.

5. A system as recited in claim 4, further comprising a means for associating the secret data with an object in the foreign system.

6. A system as recited in claim 1, wherein the encryption and decryption systems use private/public keys.

7. A system as recited in claim 1, wherein the secret data comprises a password.

8. A system as recited in claim 7, wherein the object is a user object and the password is associated with the user object.

9. A system as recited in claim 1, wherein the access control mechanism comprises login security.

10. A system as recited in claim 1, wherein the access control mechanism comprises directory security.

11. A system as recited in claim 1, wherein the distributed directory is organized in partitions, and the replication of objects and attributes by the replication system is at least partially dependent upon the organization of the partitions.

12. A method in a computer system for transmitting and receiving secured information, comprising the steps of:
    (a) encrypting secret data to create encrypted data;
    (b) associating the encrypted data with an attribute of an object in a distributed directory;
    (c) transmitting the encrypted data as a value of the attribute across the distributed directory by a replication system of the distributed directory;
    (d) accessing the attribute of the object;
    (e) retrieving the encrypted data;
    (f) decrypting the encrypted data; and
    (g) retrieving the secret data.

13. A method as recited in claim 12, wherein the secret data comprises a password.

14. A method as recited in claim 13, wherein the steps of encrypting and decrypting involve the use of a private/public key pair.

15. A method as recited in claim 12, wherein the step of accessing is enforced by the security of the distributed directory.

16. A method as recited in claim 12, wherein the distributed directory operates on a client/server network.

17. A method as recited in claim 16, wherein the secret data is being transmitted to a computer operating a foreign system.

18. A method as recited in claim 17, further comprising the step of associating the secret data with an object in the foreign system.

19. A computer readable medium containing a program capable of performing the method of claim 12.

20. A computer readable medium, comprising a program capable of performing the step of:

(a) encrypting secret data to create encrypted data;

(b) associating the encrypted data with an attribute of an object in a distributed directory;

(c) transmitting the encrypted data as a value of the attribute across the distributed directory by a replication system of the distributed directory;

(d) accessing the attribute of the object;

(e) retrieving the encrypted data;

(f) decrypting the encrypted data; and (g) retrieving the secret data.

21. A computer readable medium as recited in claim 19, wherein the computer readable medium is a magnetic storage medium.

22. A computer readable medium as recited in claim 19, wherein the computer readable medium is an optical storage medium.

23. A computer readable medium as recited in claim 19, wherein the computer readable medium is an electronic storage medium.

24. A method in a computer system for transmitting secured data to a computer, comprising the steps of:

(a) accessing by the computer a distributed directory;

(b) generating a private/public key pair;

(c) publishing the public key;

(d) generating secret data;

(e) encrypting the secret data using the public key to create encrypted data;

(f) associating the encrypted data with an attribute of an object in the distributed directory;

(g) replicating the encrypted data as a value of the attribute to the computer by a replication system of the distributed directory;

(h) accessing by the computer the encrypted data; and (i) decrypting the encrypted data using the private key.

25. A method as recited in claim 24, wherein the computer is operating a foreign system.

26. A method as recited in claim 25, further comprising after step (i) the step of associating the secret data with an object in the foreign system.

27. A method as recited in claim 26, wherein the secret data comprises a password.

28. A method as recited in claim 26, wherein the object in the distributed directory and the object in the foreign system both represent a user.

29. A computer readable medium containing a program capable of performing the method of claim 24.

* * * * *